United States Patent
Accapadi et al.

(10) Patent No.: US 7,844,859 B2
(45) Date of Patent: Nov. 30, 2010

(54) METHOD AND APPARATUS FOR INSTRUCTION TRACE REGISTERS

(75) Inventors: Jos Manuel Accapadi, Austin, TX (US); Andrew Dunshea, Austin, TX (US); Miho Ogishima, Pflugerville, TX (US); Suzanne Shi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 11/924,192

(22) Filed: Oct. 25, 2007

(65) Prior Publication Data

US 2009/0113239 A1  Apr. 30, 2009

(51) Int. Cl.
*G06F 11/00* (2006.01)
(52) U.S. Cl. .......................................... 714/45; 714/38
(58) Field of Classification Search .................. 714/38, 714/45
See application file for complete search history.

(56) References Cited

U.S. PATENT DOCUMENTS

| | | | | |
|---|---|---|---|---|
| 6,175,914 | B1 * | 1/2001 | Mann | 712/227 |
| 6,314,530 | B1 * | 11/2001 | Mann | 714/38 |
| 6,901,581 | B1 * | 5/2005 | Schneider | 717/124 |
| 6,912,675 | B2 * | 6/2005 | Swoboda | 714/45 |
| 7,454,666 | B1 * | 11/2008 | Jordan et al. | 714/45 |
| 7,603,589 | B2 * | 10/2009 | Swoboda | 714/45 |
| 7,617,420 | B2 * | 11/2009 | Kimura | 714/45 |
| 2006/0259826 | A1 * | 11/2006 | Swoboda et al. | 714/38 |

OTHER PUBLICATIONS

Ramer, "Logic Interface to Allow High Performance Event Tracing with Low Performance Monitoring Devices", IBM Technical Disclosure Bulletin, Oct. 1986, pp. 2076-2079.
Brown et al., "Circuit for Tracing Branch Instructions", IBM Technical Disclosure bulletin, Dec. 1979, pp. 2651-2654.
Moore, "Instruction Trace Apparatus", IBM Technical Disclosure Bulletin, Feb. 1978, pp. 3503-3506.
Ryle, "Program Tracing", IBM Technical Disclosure Bulletin, Dec. 1974, pp. 1865-1866.

* cited by examiner

*Primary Examiner*—Robert Beausoliel
*Assistant Examiner*—Charles Ehne
(74) *Attorney, Agent, or Firm*—Yee & Associates, P.C.; David A. Mims, Jr.

(57) ABSTRACT

A computer implemented method, apparatus, and computer usable program product for utilizing instruction trace registers. In one embodiment, a value in a target processor register in a plurality of processor registers is updated in response to executing an instruction associated with program code. In response to updating the value in the target processor register, an address for the instruction is copied from an instruction address register into an instruction trace register associated with the target processor register. The instruction trace register holds the address of the instruction that updated the value stored in the target processor register.

24 Claims, 4 Drawing Sheets

METHOD AND APPARATUS FOR INSTRUCTION TRACE REGISTERS

BACKGROUND OF THE INVENTION

1. Field of the Invention

The present invention is related generally to a data processing system and in particular to an apparatus and computer program product for processor registers. More particularly, the present invention is directed to an apparatus and computer usable program code for using instruction trace registers to identify instructions responsible for updated values in the processor registers.

2. Description of the Related Art

A processor register is memory in a processor that holds instruction operands or stores the result of an instruction. Data is moved from main memory into registers for utilization, manipulation, and updating of the data during program execution. When a computer program executes, the instructions in the program operate directly on the register values. As the instructions execute, the values in the registers are updated by the executing instructions. For example, if a given instruction adds a value in register 2 to a value in register 3 and places that, new value in register 10.

Using currently available solutions, it can be extremely difficult or impossible to determine which instruction in a program code was responsible for the current register value when examining a register dump. Thus, when a value in a processor register is updated during program execution, users frequently cannot accurately or reliably determine which instruction in the program code was responsible for changing the register value at a latter point in time.

SUMMARY OF THE INVENTION

The illustrative embodiments provide a computer implemented method and apparatus for utilizing instruction trace registers. In one embodiment, a value in a target register in a plurality of processor registers is updated in response to executing an instruction associated with program code. In response to updating the value in the target register, an address for the instruction is copied from an instruction address register into an instruction trace register associated with the given processor register. The instruction trace register holds the address of the instruction that updated the value stored in the target register.

In other words, the target register for any instruction which last updates the contents of the target register's value also stores the instruction's address in the target registers instruction trace register. The instruction trace register holds the address of a last instruction that updated the value stored in the given processor register associated with the instruction trace register.

In another embodiment, each processor register in a plurality of processor registers is associated with a different instruction trace register. An instruction trace register associated with a target processor register in the plurality of processor registers holds an address of a last, instruction in the program code that updated a value stored in the target processor register associated with the given instruction trace register.

The illustrative embodiments also provide a computer implemented method and computer usable program product for utilizing instruction, trace registers by a maintenance process. In one embodiment, the maintenance process retrieves an address from each instruction trace register in a plurality of instruction trace registers to form a set of addresses. Each instruction trace register is associated with a processor register in a processor core. The maintenance process identifies a set of instructions in a program code corresponding to the set of addresses to form a set of known points in the program code. The maintenance process then generates an execution path through the program code using the set of known points.

In one embodiment, the maintenance process is a debugger process that retrieves the plurality of addresses from the plurality of instruction trace registers in response to a system crash or a program crash. In another embodiment, the maintenance process is an optimising compiler.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
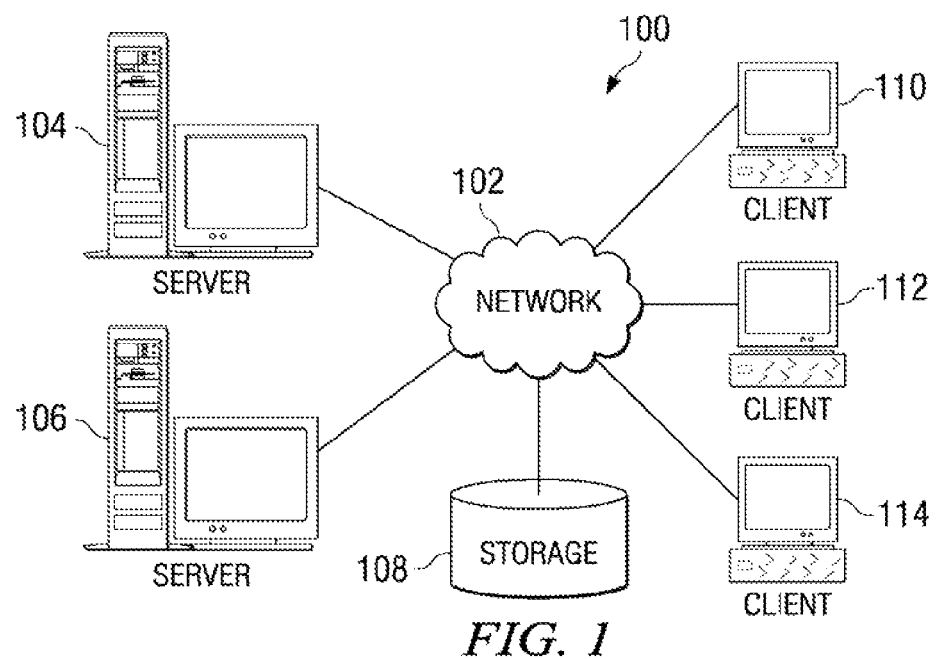
FIG. 1 is a pictorial representation of a network of data processing systems in which illustrative embodiments may be implemented.
Figure 2:
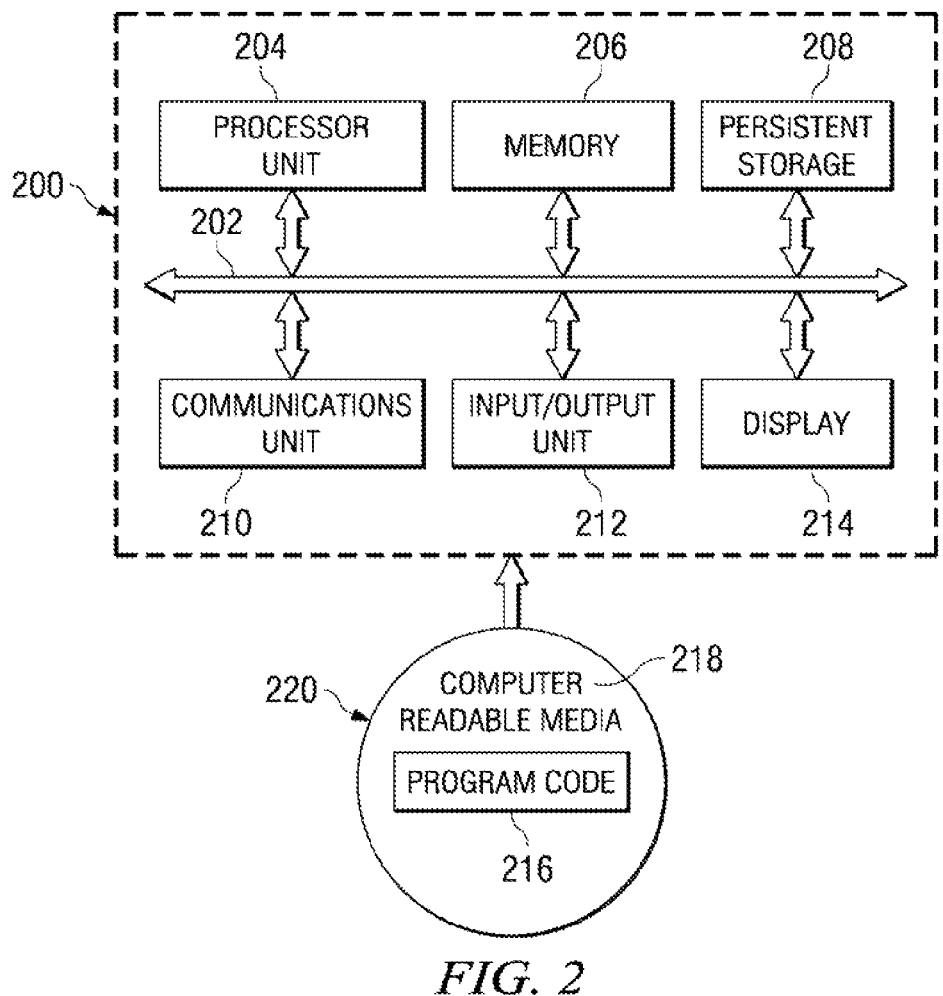
FIG. 2 is a block diagram of a data processing system in which illustrative embodiments may be implemented.
Figure 3:
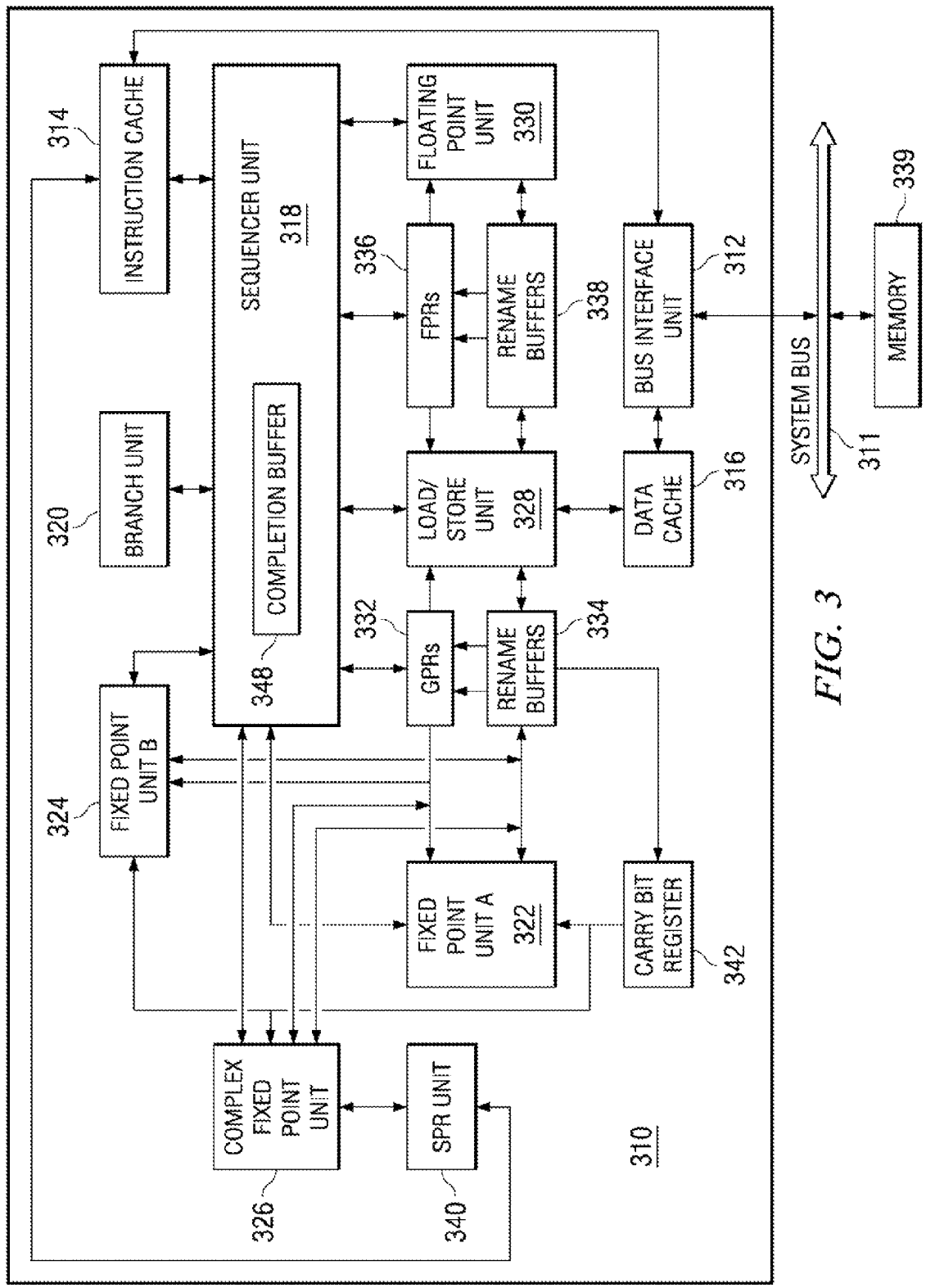
FIG. 3 is a block diagram of a processor system for processing information in which illustrative embodiments may be implemented.

With reference now to the figures and in particular with reference to FIGS. 1-3, exemplary diagrams of data processing environments are provided in which illustrative embodiments may be implemented. It should be appreciated that FIGS. 1-3 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference now to FIG. 2, a block diagram of a data processing system is shown in which illustrative embodiments may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multiprocessor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as, program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive or a flash memory that is connected to data processing system 200. The tangible form of computer readable media 218 is also referred to as computer recordable storage media.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

For example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may toe, for example, memory 206 or a cache such as found in an interface and memory controller hub that may be present in communications fabric 202.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in interface and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

FIG. 3 is a block diagram of a processor system for processing information according to the preferred embodiment. In the preferred embodiment, processor 310 is a single integrated circuit superscalar microprocessor. Accordingly, as discussed further herein below, processor 310 includes various units, registers, buffers, memories, and other sections, all of which are formed by integrated circuitry. Also, in the preferred embodiment, processor 310 operates according to reduced instruction set computer ("RISC") techniques. As shown in FIG. 3, a system bus 311 is connected to a bus interface unit ("BIU") 312 of processor 310. BIU 312 controls the transfer of information between processor 310 and system bus 311.

BIU 312 is connected to an instruction cache 314 and to a data cache 316 of processor 310. Instruction cache 314 outputs instructions to a sequencer unit 318. In response to such instructions from instruction cache 314, sequencer unit 318 selectively outputs instructions to other execution circuitry of processor 310.

In addition to sequencer unit 318, in the preferred embodiment, the execution circuitry of processor 310 includes multiple execution units, namely a branch unit 320, a fixed-point unit A ("FXUA") 322, a fixed-point unit B ("FXUB") 324, a complex fixed-point unit ("CFXU") 326, a load/store unit ("LSU") 328, and a floating-point unit ("FPU") 330. FXUA 322, FXUB 324, CFXU 326, and LSU 328 input their source operand information from general-purpose architectural registers ("GPRs") 332 and fixed-point rename buffers 334. Moreover, FXUA 322 and FXUB 324 input a "carry bit" from a carry bit ("CA") register 342. FXUA 322, FXUB 324, CFXU 326, and LSU 328 output results (destination operand information) of their operations for storage at selected entries in fixed-point rename buffers 334. Also, CFXU 326 inputs and outputs source operand information and destination operand information to and from special-purpose register processing unit ("SPR unit") 340.

FPU 330 inputs its source operand information from floating-point architectural, registers ("FPRs") 336 and floating-point rename buffers 338. FPU 330 outputs results (destination operand information) of its operation for storage at selected entries in floating-point rename buffers 338.

In response to a Load instruction, LSU 328 inputs information from data cache 316 and copies such information to selected ones of rename buffers 334 and 338. If such information is not stored in data cache 316, then data cache 316 inputs (through BIU 312 and system bus 311) such information from a system memory 339 connected to system bus 311. Moreover, data cache 316 is able to output (through BIU 312 and system bus 311) information from data cache 316 to system memory 339 connected to system bus 311. In response to a Store instruction, LSU 328 inputs information from a selected one of GPRs 332 and FPRs 336 and copies such information to data cache 316.

Sequencer unit 318 inputs and outputs information to and from GPRs 332 and FPRs 336. From sequencer unit 318, branch unit 320 inputs instructions and signals indicating a present state of processor 310. In response to such instructions and signals, branch unit 320 outputs (to sequencer unit 318) signals indicating suitable memory addresses storing a sequence of instructions for execution by processor 310. In response to such signals from branch unit 320, sequencer unit 318 inputs the indicated sequence of instructions from instruction cache 314. If one or more of the sequence of instructions is not stored in instruction cache 314, then instruction cache 314 inputs (through BIU 312 and system bus 311) such instructions from system memory 339 connected to system bus 311.

In response to the instructions input from instruction cache 314, sequencer unit 318 selectively dispatches the instructions to selected ones of execution units 320, 322, 324, 326, 328, and 330. Each execution unit executes one or more instructions of a particular class of instructions. For example, FXUA 322 and FXUB 324 execute a first class of fixed-point, mathematical operations on source operands, such as addition, subtraction, ANDing, ORing and XORing. CFXU 326 executes a second class of fixed-point operations on source operands, such as fixed-point multiplication and division. FPU 330 executes floating-point operations on source operands, such as floating-point multiplication and division.

As information is stored at a selected one of rename buffers 334, such information is associated with a storage location (e.g. one of GPRs 332 or CA register 342) as specified by the instruction for which the selected rename buffer is allocated. Information stored at a selected one of rename buffers 334 is copied to its associated one of GPRs 332 (or CA register 342) in response to signals from sequencer unit 318. Sequencer unit 318 directs such copying of information stored at a selected one of rename buffers 334 in response to "completing" the instruction that generated the information. Such copying is called "writeback."

As information is stored at a selected one of rename buffers 338, such information is associated with one of FPRs 336. Information stored at a selected one of rename buffers 338 is copied to its associated one of FPRs 336 in response to signals from sequencer unit 318. Sequencer unit 318 directs such copying of information stored at a selected one of rename buffers 338 in response to "completing" the instruction that generated the information.

Processor 310 achieves high performance by processing multiple instructions simultaneously at various ones of execution units 320, 322, 324, 326, 328, and 330. Accordingly, each instruction is processed as a sequence of stages, each being executable in parallel with stages of other instructions. Such a technique is called "pipelining." In a significant aspect of the illustrative embodiment, an instruction is normally processed as six stages, namely fetch, decode, dispatch, execute, completion, and writeback.

In the fetch stage, sequencer unit 318 selectively inputs (from instruction cache 314) one or more instructions from one or more memory addresses storing the sequence of instructions discussed further hereinabove in connection with branch unit 320, and sequencer unit 318.

In the decode stage, sequencer unit 318 decodes up to four fetched instructions. In the dispatch stage, sequencer unit 318 selectively dispatches up to four-decoded instructions to selected (in response to the decoding in the decode stage) ones of execution units 320, 322, 324, 326, 328, and 330 after reserving rename buffer entries for the dispatched instructions' results (destination operand information). In the dispatch stage, operand information is supplied to the selected execution units for dispatched instructions. Processor 310 dispatches instructions in order of their programmed sequence.

In the execute stage, execution units execute their dispatched instructions and output results (destination operand information) of their operations for storage at selected entries in rename buffers 334 and rename buffers 338 as discussed further hereinabove. In this manner, processor 310 is able to execute instructions out-of-order relative to their programmed sequence.

In the completion stage, sequencer unit 318 indicates an instruction is "complete." Processor 310 "completes" instructions in order of their programmed sequence.

In the writeback stage, sequencer 318 directs the copying of information from rename buffers 334 and 338 to GPRs 332 and FPRs 336, respectively. Sequencer unit 318 directs such copying of information stored at a selected rename buffer. Likewise, in the writeback stage of a particular instruction, processor 310 updates its architectural states in response to the particular instruction. Processor 310 processes the respective "writeback" stages of instructions in order of their programmed sequence. Processor 310 advantageously merges an instruction's completion stage and writeback stage in specified situations.

In the illustrative embodiment, each instruction requires one machine cycle to complete each of the stages of instruction processing. Nevertheless, some instructions (e.g., complex fixed-point instructions executed by CFXU 326) may require more than one cycle. Accordingly, a variable delay may occur between a particular instruction's execution and completion stages in response to the variation in time required for completion of preceding instructions.

A completion buffer 348 is provided within sequencer 318 to track the completion of the multiple instructions which are being executed within the execution units. Upon an indication that an instruction or a group of instructions have been completed successfully, in an application specified sequential order, completion buffer 348 may be utilized to initiate the transfer of the results of those completed instructions to the associated general-purpose registers.

The hardware in FIGS. 1-3 may vary depending on the implementation. Other internal, hardware or peripheral devices, such as flash memory, equivalent non-volatile memory, or optical disk drives and the like, may be used in addition to or in place of the hardware depicted in FIGS. 1-3. Also, the processes of the illustrative embodiments may be applied to a multiprocessor data processing system.

The illustrative embodiments provide a computer implemented method and apparatus for utilizing instruction trace registers. In one embodiment, a value in a target register in a plurality of processor registers is updated in response to executing an instruction associated with program code. In response to updating the value in the target register, an address for the instruction is copied from an instruction address register into an instruction trace register associated with the given processor register. The instruction trace register holds the address of the instruction that updated the value stored in the target register.

In other words, the target register for any instruction which updates the contents of the target register's value, also stores the instruction's address in the target registers instruction trace register. The target registers is a processor register that is updated by the execution unit during execution of an instruction. The instruction trace register associated with the target processor register holds the address of a last instruction that updated the value stored in the target processor register. The instruction trace register is updated by the hardware processor when the instruction that updated the target processor register is executed.

In another embodiment, each processor register. In a plurality of processor registers is associated with a different instruction trace register. An instruction trace register associated with a target processor register in the plurality of processor registers holds an address of a last instruction in the program code that updated a value stored in the target processor register associated with the given instruction trace register.

The illustrative embodiments also provide a computer implemented method and computer usable program product for utilizing instruction trace registers by a maintenance process. In one embodiment, the maintenance process retrieves an address from each instruction trace register in a plurality of instruction trace registers to form a set of addresses. Each instruction trace register is associated with a processor register in a processor. The maintenance process identifies a set of instructions in a program code corresponding to the set of addresses to form a set of known points in the program code. The maintenance process then generates an execution path through the program code using the set of known points.

In one embodiment, the maintenance process is a debugger process that retrieves the plurality of addresses from the plurality of instruction trace registers in response to a system crash or a program crash. In another embodiment, the maintenance process is an optimising compiler.

Figure 4:
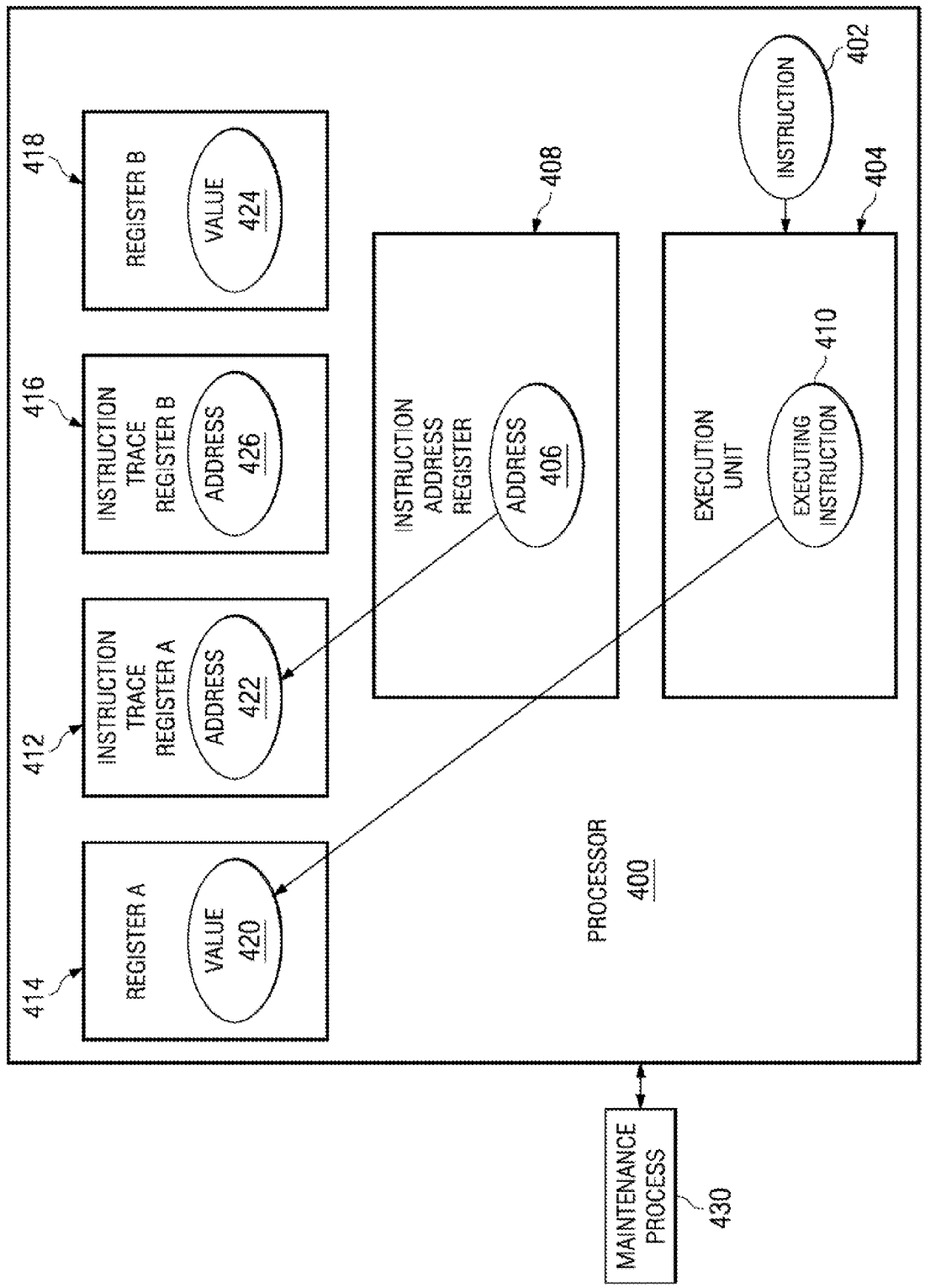
FIG. 4 is a block diagram of a processor having a set of instruction trace registers in accordance with an illustrative embodiment.

Turning now to FIG. 4, is a block diagram of a processor having a set of instruction trace registers is shown in accordance with an illustrative embodiment. Processor 400 is implemented as any type of known or available processor for executing code, such as, without limitation, processing unit 206 in FIG. 2 or processor 310 in FIG. 3. Processor 400 may be, but is not limited to, a central processing unit (CPU) or a digital signal processor (DSP). Processor 400 may be a single core processor, a dual-core processor, a multi-core processor, a graphics processor, a central processing unit (CPU), or any type of processor.

Processor 400 fetches instruction 402 from a plurality of instructions associated with a program for execution in execution unit 404. Instructions are computer readable instructions associated with an application or other computer program. Instructions are stored in memory, such as memory 206 in FIG. 2. The memory may be implemented in any type of memory, such as, without limitation, a hard disk, a main memory, a compact disk (CD), a random access memory (RAM), a read only memory (ROM), a flash memory, or any other type of memory.

Instruction 402 is fetched from a location identified by address 406 in instruction address register (IAR) 408. Processor 400 has a single IAR for holding an address of the next instruction to be executed by execution unit 404. As an instruction identified by address 406 is fetched and sent to execution unit for executing, address 406 in instruction address register 408 is automatically updated with the address of the next, instruction to be fetched and executed.

Executing instruction 410 is an instruction that is currently executing in execution unit 404. Executing instruction 410 may update or change a value stored in a processor register associated with processor 400 as executing instruction 410 executes. For example, if executing instruction 410 subtracts a value stored in register H from a value stored in register I and stores the result in register C, then executing instruction 410 has updated or changed the value held in register C. Using currently available methods and technology, it is difficult or impossible for a user to determine which instruction in a plurality of instructions associated with a program was responsible for changing the value in register C.

Therefore, the illustrative embodiments provide one or more instruction trace registers in a processor. Each instruction trace register is associated with a different hardware register in processor 400. A hardware register in processor 400 is referred to herein as a processor register or simply a register.

A processor register is implemented as, without limitation, a data register, an address register, a conditional register, a general purpose register, a special purpose register, a vector register, a floating point register, a user-variable register, a control and status register, and/or any other type of processor register.

In this example, instruction trace register A 412 is associated with register A 414. In this example, there is a direct, physical relationship between register A 414 and instruction trace register A 412. Register A 414 uses instruction trace register A 412 and is associated with instruction trace register A 412 by the hardware.

Instruction trace register B 416 is associated with register B 418. When processor 400 updates value 420 stored in register A 414. Processor 400 then copies address 406 from instruction address register 408 into instruction trace register A 412 as address 422. When a next instruction is executed in execution unit, address 406 in instruction trace register 408 is updated to reflect the address of the next instruction to be fetched and executed. However, address 422 in instruction trace register A 422 remains unchanged and preserves the address of the instruction that was responsible for changing the value held in register A 414. Thus, instruction trace register A 412 holds an address of the last instruction that altered value 420 in register A 414.

Likewise, when executing instruction 410 updates value 424 in register 418, processor 400 copies address 406, which is the address of executing instruction 410, into instruction trace register B 416 to form address 426. Address 426 is the address of the instruction that updated value 424 in register B 418 when the instruction executed.

In this example, only two processor registers and two instruction trace registers are shown. However, any number of instruction trace registers may be associated with any number of processor registers in accordance with the scope of the illustrative embodiments.

In another example, when a first instruction alters value 420 stored in register A 414, processor 400 copies address 406 in instruction address register 408 into instruction trace register A 412 to form instruction address 422. When a second instruction is fetched, address 406 in instruction address register 408 is updated with the address of the second instruction. The second instruction is then sent to execution unit 404 for execution. In this example, when the second instruction executes, the second instruction updates value 424 in register B 418. Processor 400 copies the address of the second instruction from Instruction address register 408 into instruction trace register B 416 to form address 426. However, instruction trace register A 416 continues to hold the address of the first instruction as address 422 because instruction trace register A 416 only holds the address of an instruction that last updated the value in register A 414.

Instruction trace register B 424 holds a copy of the address of the second instruction from the instruction address register because instruction trace register B 416 corresponds to register B 418 and instruction trace register B 416 only stores the address of an instruction that last altered value 424 of register B 418.

Instruction address register 408 is then updated with an address of a third instruction to be executed. The third instruction is fetched from a location indicated by the address in instruction address register 408 and sent to execution unit 404 for execution. Execution unit 404 executes the third instruction. During execution, the third instruction updates a value in a third register. The addresses in instruction trace register A 412 and instruction trace register B 416 are not altered because the values held in register A 414 and register B 418 are not altered by execution of the third instruction.

Next, instruction address register 408 is updated with an address of a fourth instruction to be executed. The fourth instruction is fetched from the location indicated by the address in instruction address register 408. In this example, when the fourth instruction is executed, the fourth instruction updates value 420 in register A 414. Therefore, processor 400 copies the address of the fourth instruction from instruction address register 408 into instruction trace register A 412. Thus, instruction trace register A 412 no longer holds the address of the first instruction. Instead, instruction trace register A 412 now holds the address of the fourth instruction, because the fourth instruction is the last instruction that, altered the value held in register A 414.

If a computer system crashes and/or a program crashes, maintenance process 430 retrieves the addresses from the instruction trace registers, such as instruction trace register A 412 and instruction trace register B 416, to form a set of addresses. Maintenance process 430 is a process for performing maintenance, debugging, managing, optimizing, or performing other actions on instructions associated with the program. Maintenance process 430 may be implemented as, without limitation, a debugger program, a code optimization program, a compiler, an optimizing compiler, a performance monitoring unit, a thread scheduler, or any other maintenance process.

Maintenance process 430 identifies a set of instructions in the program code that corresponds to the set of addresses from the instruction trace registers to form a set of known points. The set of known points are points or instructions in the program code that were executed and that were responsible for changing register values during execution of the program code. The maintenance process can use this set of known points to construct a likely execution path through the program code. A likely execution path may be the exact execution path taken by the program code during execution or the likely execution path may be a probable execution path that was most likely taken during execution of the program code.

An execution path is a path of instructions in the program code that were executed. In other words, every instruction is not always executed and instructions are not always executed in order due to loops and branches. An execution path is an identification of the instructions that were executed and/or an order in which the instructions were executed.

In this manner, the instruction trace registers track the last instruction which affected each processor register value. The instruction trace registers allow users to identify known points in the program code that were executed and that are related to updates in register values. When a dump is performed to identify the code path or sequence of instructions responsible for the values in the registers, the addresses stored in the instruction trace registers are retrieved and used to construct a likely execution path. The instruction trace registers enable an analyst to obtain additional information regarding the code path that is more accurate and easier to retrieve or obtain.

The embodiments associate or assign instruction trace registers to each existing processor register. An instruction trace register is a hardware register in a processor for holding an address of an instruction that last updated a value in a processor register associated with the instruction trace register. In one embodiment, each instruction trace register is associated with a processor register. For example, if a processor has thirty-two (32) registers, the processor will also have thirty-two (32) instruction trace registers. The instruction trace register associated with a given processor register stores the address of the last instruction that altered or updated the value of the given processor register by copying the current instruction address register into the associated instruction trace register each time the given processor register's value updates.

In another embodiment, every processor register is not associated with an instruction trace register. Instead, a selected set of processor registers are associated with instruction trace registers. For example, but without limitation, in one embodiment, every general purpose register is associated with an instruction trace register, but other processor registers, such as special purpose registers or vector registers, are not associated with instruction trace registers. The processor registers that are unassociated with an instruction trace register may be referred to herein as unassociated registers. Thus, every instruction trace register is associated with a single processor register. However, every processor register is not required to be associated with an instruction trace register. The instruction trace register updates on instruction completion.

Figure 5:
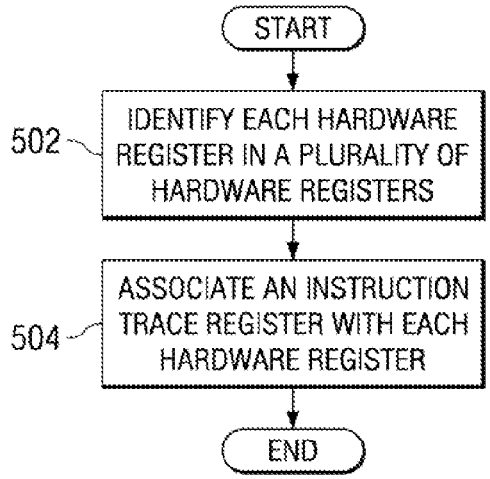
FIG. 5 is a flowchart illustrating a process for associating an instruction trace register with a processor register in accordance with an illustrative embodiment.

FIG. 5 is a flowchart illustrating a process for associating an instruction trace register with a processor register in accordance with an illustrative embodiment. The process in FIG. 5 is implemented by a user or a processor, such as processor 400 in FIG. 4. The process identifies each hardware register in a plurality of hardware registers on a processor (step 502). A hardware register is a register in a processor, which may also be referred to as a processor register. The process associates an instruction trace register with each hardware register (step 504) with the process terminating thereafter.

Figure 6:
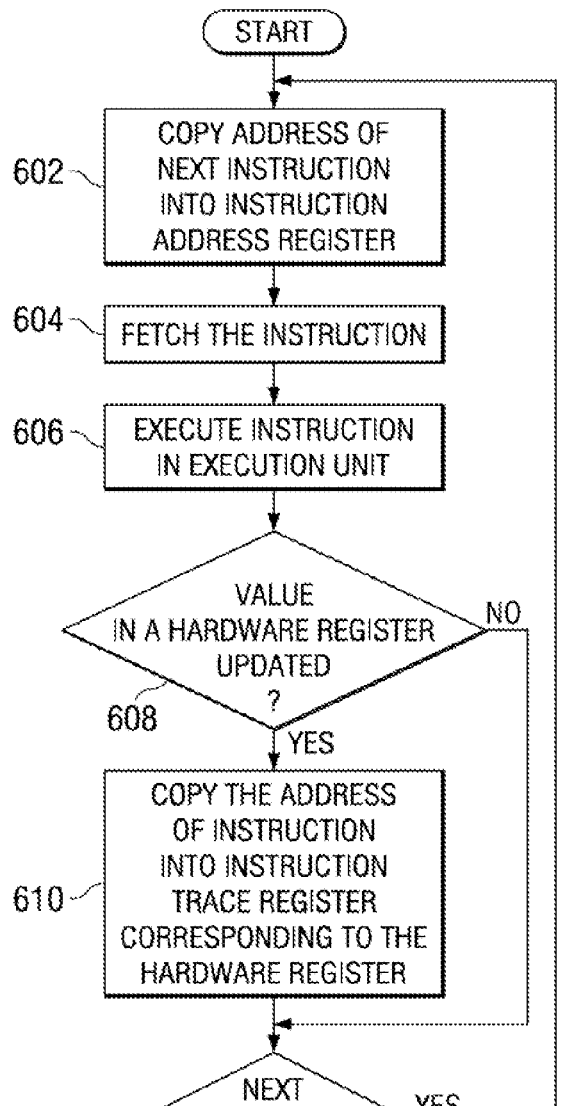
FIG. 6 is a flowchart illustrating a process for copying an address of an instruction that altered a value in a processor register in the corresponding instruction trace register in accordance with an illustrative embodiment.

Turning now to FIG. 6, a flowchart illustrating a process for copying an address of an instruction that altered a value in a processor register in the corresponding instruction trace register is shown in accordance with an illustrative embodiment. The process in FIG. 6 is implemented by a processor, such as processor 400 in FIG. 4.

The process begins by copying an address of a next instruction to be fetched into an instruction address register (step 602). The process fetches the instruction from a location identified by the address in the instruction address register (step 604). The process executes the fetched instruction in an execution unit of the processor (step 606).

The process then makes a determination as to whether a value in a hardware register is updated (step 608) by the executing instruction. A value is updated when the value is updated, overwritten, or otherwise altered. If the value is updated, the process copies the address of the instruction that updated the register value from the instruction address register into an instruction trace register corresponding to the hardware register (step 610). After copying the address of the instruction into the instruction trace register at step 606 or if a value in a register is not updated at step 604, the process then makes a determination as to whether a next instruction is executing (step 612). If a next instruction is executing, the process returns to step 602 and iteratively executes steps 602-612 until there are no longer any instructions executing, with the process terminating thereafter.

Figure 7:
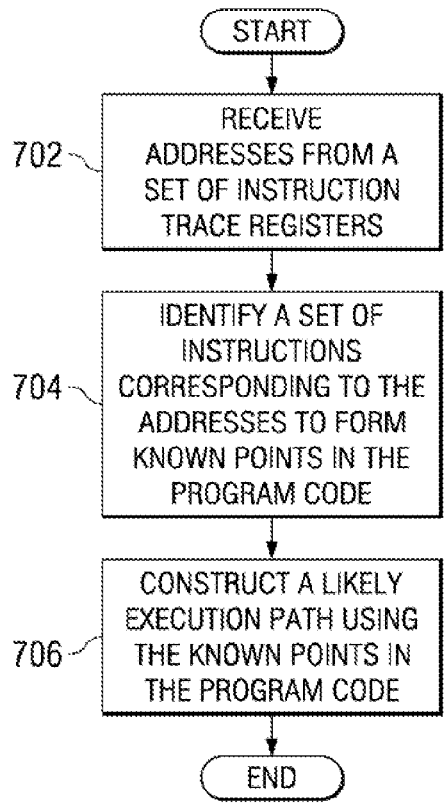
FIG. 7 is a flowchart illustrating a process for using instruction trace registers to generate an execution path in accordance with an illustrative embodiment.

FIG. 7 is a flowchart illustrating a process for using instruction trace registers to trace a code path that resulted in changing a value in a processor register. The process in FIG. 7 is implemented by a maintenance process, such as maintenance process 430 in FIG. 4. The process may also be implemented manually by a user.

The process begins by retrieving addresses from a set of instruction trace registers in a processor (step 702). The process identifies a set of instructions corresponding to the addresses retrieved from the instruction trace registers to form known points in the program code (step 704). The process constructs a likely execution path using the known points in the program code (step 706) with the process terminating thereafter. A likely execution path is a most probable execution path taken by the program code during execution.

The illustrative embodiments provide a computer implemented method and apparatus for utilizing instruction trace registers. In one embodiment, a value in a target register in a plurality of processor registers is updated in response to executing an instruction associated with program code. In response to updating the value in the target register, an address for the instruction is copied from an instruction address register into an instruction trace register associated with the given processor register. The instruction trace register holds the address of the instruction that updated the value stored in the target register.

In other words, the target register for any instruction which updates the contents of the target register's value, also stores the instruction's address in the target registers instruction trace register. The instruction trace register holds the address of a last instruction that updated the value stored in the given processor register associated with the instruction trace register.

In another embodiment, each processor register in a plurality of processor registers is associated with a different instruction trace register. An instruction trace register associated with a target processor register in the plurality of processor registers holds an address of a last instruction in the program code that updated a value stored in the target processor register associated with the given instruction trace register.

The illustrative embodiments also provide a computer implemented method and computer usable program product for utilizing instruction trace registers by a maintenance process. In one embodiment, the maintenance process retrieves an address from each instruction trace register in a plurality of instruction trace registers to form a set of addresses. Each instruction trace register is associated with a processor register in a processor. The maintenance process identifies a set of instructions in a program code corresponding to the set of addresses to form a set of known points in the program code. The maintenance process then generates an execution path through the program code using the set of known points.

In one embodiment, the maintenance process is a debugger process that retrieves the plurality of addresses from the plurality of instruction trace registers in response to a system crash or a program crash. In another embodiment, the maintenance process is an optimizing compiler.

Thus, the invention tracks the addresses of the instructions that updated the values in processor registers, such as, without limitation, general-purpose registers and conditional registers. The process identifies known points in the program code using the addresses held in the instruction trace registers. In case of a system crash or program crash, the known points are used to construct an execution path through the program code. In other words, the known points identify as set of instructions that were definitely executed and responsible for updates to hardware register values. The known points can also be used to pinpoint the sequence of instructions that was executed and possibly responsible for the crash.

The addresses stored in the instruction trace registers permit a user or systems analyst to more easily and accurately construct an execution path that was responsible for the current values in the processor registers. If a user is able to determine how the update in the register values occurred, the user may be able to determine how a problem or error in the program code or system occurred. The instruction trace registers also enable a user to more accurately determine if a problem with a program is a software problem or a hardware problem.

Moreover, the addresses of the instructions that updated the processor registers are copied into the instruction trace registers and held for future use without requiring any program modifications or changes to the program code because the addresses are copied by the hardware processor into hardware instruction trace registers in the processor.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the steps may occur out of the order noted in the figures. For example, two steps shown in succession may, in fact, be executed substantially concurrently, or the steps may sometimes be executed in the reverse order, depending upon the functionality involved.

The invention can take the form of an entirely hardware embodiment. In a preferred embodiment, the invention is implemented in hardware. Any software utilised in embodiments of the invention includes, but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain or store the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Further, a computer storage medium may contain or store a computer readable program code.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment, was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for utilizing instruction trace registers, the computer implemented method comprising:
    associating an instruction trace register with a target processor register in a plurality of processor registers;
    executing an instruction associated with program code;
    determining whether or not the instruction updated a value in the target processor register;
    responsive to determining that the instruction updated the value in the target processor register, copying an address that identifies the instruction itself from the instruction address register into the instruction trace register that is associated with the target processor register, wherein the address of the instruction that is stored in the target processor register is also stored in the instruction trace register; and
    responsive to determining that the instruction did not update the value in the target processor register, executing a next instruction, wherein the instruction trace register remains unchanged.

2. The computer implemented method of claim 1 further comprising:
    identifying each processor register in the plurality of processor registers; and
    associating an instruction trace register with each processor register in the plurality of processor registers, wherein each processor register is associated with a different instruction trace register, and wherein the instruction trace register associated with the target processor register in the plurality of processor registers holds an address of a last instruction in the program code that updated a value stored in the target processor register associated with the given instruction trace register.

3. The computer implemented method of claim 1 further comprising:
    retrieving a plurality of addresses from a plurality of instruction trace registers associated with the plurality of processor registers; and
    identifying a set of instructions corresponding to the plurality of addresses to form a set of known points in a program code associated with the set of instructions, wherein the set of known points are instructions in the program code that updated values stored in a set of processor registers during execution of the program code.

4. The computer implemented method of claim 3 further comprising:
constructing an execution path for the program code using the set of known points.

5. The computer implemented method of claim 3 wherein the plurality of addresses are retrieved from the plurality of instruction trace registers in response to a system crash.

6. The computer implemented method of claim 3 wherein the set of addresses are retrieved by a maintenance process.

7. The computer implemented method of claim 1 wherein the instruction trace register and the target processor register are associated using a direct physical relationship using hardware.

8. The computer implemented method of claim 1 wherein the target processor register is a first processor register and wherein the instruction trace register is a first instruction trace register, and further comprising:
executing a second instruction to form a second executing instruction;
responsive to updating a value in a second target processor register by the second executing instruction, copying an address of the second executing instruction from the instruction address register to a second instruction trace register in a plurality of instruction trace registers, wherein the second instruction trace register is associated with the second target processor register, and wherein the first instruction trace register remains unchanged.

9. A computer implemented method for utilizing instruction trace registers by a maintenance process, the computer implemented method comprising:
retrieving, by the maintenance process, an address from each instruction trace register in a plurality of instruction trace registers to form a set of addresses, wherein each instruction trace register is associated with a different processor register in a plurality of processor registers using a direct physical relationship using hardware, and wherein each one of the plurality of instruction trace registers is a hardware register;
identifying a set of instructions in a program code corresponding to the set of addresses to form a set of known points in the program code; and
generating an execution path through the program code using the set of known points.

10. The computer implemented method of claim 9 wherein a value held in a target processor register in the plurality of processor registers is updated during execution of an instruction in the set of instructions, and wherein the instruction trace register associated with the target processor register is updated with an address of the instruction in the set of instructions in response to updating the value held in the target processor register.

11. The computer implemented method of claim 9 wherein the plurality of addresses are retrieved from the plurality of instruction trace registers in response to a system crash.

12. The computer implemented method of claim 9 wherein the plurality of addresses are retrieved from the plurality of instruction trace registers in response to a program crash.

13. The computer implemented method of claim 12 wherein the maintenance process is a debugger program.

14. An apparatus comprising:
a bus system;
a communications system coupled to the bus system;
a memory connected to the bus system, wherein the memory includes computer usable program code; and
a processing unit coupled to the bus system, wherein the processing unit executes the computer usable program code to retrieve an address from each instruction trace register in a plurality of instruction trace registers to form a set of addresses; identify a set of instructions in a program code corresponding to the set of addresses to form a set of known points in the program code; and generate an execution path through the program code using the set of known points, wherein each instruction trace register is associated with a different processor register using a direct physical relationship using hardware, and wherein each one of the plurality of instruction trace registers is a hardware register.

15. The apparatus of claim 14 wherein a value held in a target processor register in the plurality of processor registers is updated during execution of an instruction in the set of instructions, and wherein the instruction trace register associated with the target processor register is updated with an address of the instruction in the set of instructions in response to updating the value held in the target processor value.

16. The apparatus of claim 15 wherein the address from each instruction trace register is retrieved by a maintenance process.

17. The apparatus of claim 16 wherein the maintenance process is a debugger program.

18. The apparatus of claim 17 wherein the maintenance process is an optimizing compiler.

19. A system for utilizing instruction trace registers, the system comprising:
a processor, wherein the processor executes a plurality of instructions associated with program code, the processor further comprising:
a plurality of processor registers, wherein each processor register in the plurality of processor registers is associated with an instruction trace register;
a plurality of instruction trace registers, wherein each instruction trace register in the plurality of instruction trace registers is associated with a processor register in the plurality of processor registers using a direct physical relationship using hardware , and wherein each one of the plurality of instruction trace registers is a hardware register, and further wherein each instruction trace register in the plurality of instruction trace registers holds an address of an instruction in the program code that updated a value stored in a processor register associated with the each instruction trace registers; and
an instruction address register, wherein the instruction address register holds an address of an executing instruction, and wherein the processor copies the address of the executing instruction into a given instruction trace register associated with a target processor register in response to the executing instruction updating a value stored in the target processor register.

20. The system of claim 19 further comprising:
a maintenance process, wherein the maintenance process retrieves a plurality of addresses from a plurality of instruction trace registers; and identifies a set of instructions corresponding to the plurality of addresses to form a set of known points in the program code, wherein the set of known points are instructions in the program code that updated values stored in at least one processor register in the plurality of processor registers during execution of the program code.

21. A computer program product stored in a computer usable medium, wherein the computer program product includes computer usable program code for utilizing instruction trace registers, said computer program product comprising:

computer usable program code for associating an instruction trace register with a target processor register in a plurality of processor registers;

computer usable program code for executing an instruction associated with program code;

computer usable program code for determining whether or not the instruction updated a value in the target processor register;

responsive to determining that the instruction updated the value in the target processor register, computer usable program code for copying an address that identifies the instruction itself from the instruction address register into the instruction trace register that is associated with the target processor register, wherein the address of the instruction that is stored in the target processor register is also stored in the instruction trace register; and responsive to determining that the instruction did not update the value in the target processor register, computer usable program code for executing a next instruction, wherein the instruction trace register remains unchanged.

22. The computer program product of claim 21 further comprising:

computer usable program code for identifying each processor register in the plurality of processor registers; and computer usable program code for associating an instruction trace register with each processor register in the plurality of processor registers, wherein each processor register is associated with a different instruction trace register, and wherein the instruction trace register associated with the target processor register in the plurality of processor registers holds an address of a last instruction in the program code that updated a value stored in the target processor register associated with the given instruction trace register.

23. The computer program product of claim 21, wherein the instruction trace register and the target processor register are associated using a direct physical relationship using hardware.

24. The computer program product of claim 21 wherein the target processor register is a first processor register and wherein the instruction trace register is a first instruction trace register, and further comprising:

computer usable program code for executing a second instruction to form a second executing instruction;

responsive to updating a value in a second target processor register by the second executing instruction, computer usable program code for copying an address of the second executing instruction from the instruction address register to a second instruction trace register in a plurality of instruction trace registers, wherein the second instruction trace register is associated with the second target processor register, and wherein the first instruction trace register remains unchanged.

* * * * *